United States Patent

[11] 3,602,699

| | | |
|---|---|---|
| [72] | Inventors | Shin-ichi Kamachi;<br>Yuzi Ikuno, both of Tokyo, Japan |
| [21] | Appl. No. | 800,934 |
| [22] | Filed | Feb. 20, 1969 |
| [45] | Patented | Aug. 31, 1971 |
| [73] | Assignee | Olympus Optical Co., Ltd.<br>Tokyo, Japan |
| [32] | Priority | Mar. 1, 1968 |
| [33] | | Japan |
| [31] | | 43-12869 |

[54] DEVICE FOR GENERATING AN INSTRUCTION SIGNAL FOR USE IN AN AUTOMATIC DIGITAL READOUT APPARATUS
2 Claims, 6 Drawing Figs.

[52] U.S. Cl. .................................................. 235/92 EA,
235/92 DP
[51] Int. Cl. ...................................................... H03k 21/08
[50] Field of Search ............................................ 235/92

[56] References Cited
UNITED STATES PATENTS
| | | | |
|---|---|---|---|
| 2,864,948 | 12/1958 | Neff ............................ | 235/92 U |
| 3,063,631 | 11/1962 | Ray ............................. | 235/92 |
| 3,360,636 | 12/1967 | Ramsay et al................ | 235/92 |

Primary Examiner—Maynard R. Wilbur
Assistant Examiner—Joseph M. Thesz, Jr.
Attorney—Otto John Munz ABSTRACT: Device for generating an instruction signal for demanding the digitally measured value of displacement to be transferred from the measuring station to the memory of an automatic digital readout apparatus. The measuring station generates a counting pulse successively each time the displacement reaches a measuring unit so as to be applied to the electronic counter of the automatic digital readout apparatus so that the digitally indicated measured value corresponding to the displacement is generated therein. A detecting pulse is generated when the displacement reaches the desired measuring point, thereof and this detecting pulse is applied to the electronic counter through a readout instruction signal-generating circuit so as to permit the digitally indicated measured value provided therein at the measuring point of the displacement to be transferred to the memory after the interference period of the electronic counter elapses, in which interference period the electronic counter cannot provide the current digitally indicated measured value due to the counting operation therein. The readout instruction signal-generating circuit comprises at least one delay circuit, the total delay time of the above at least one delay circuit is selected to be greater than the interference period of the electronic counter.

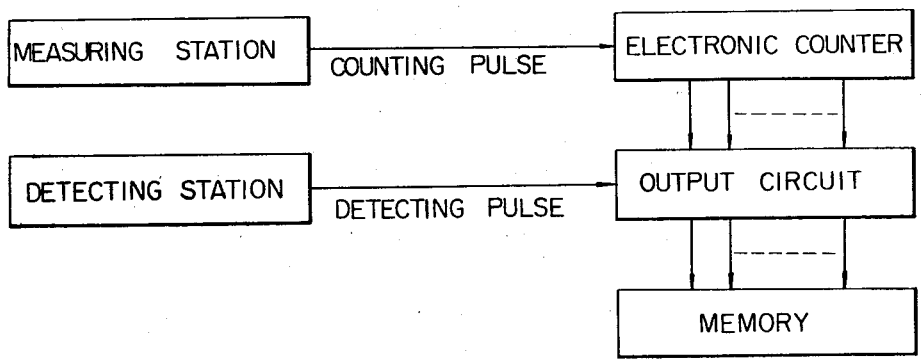
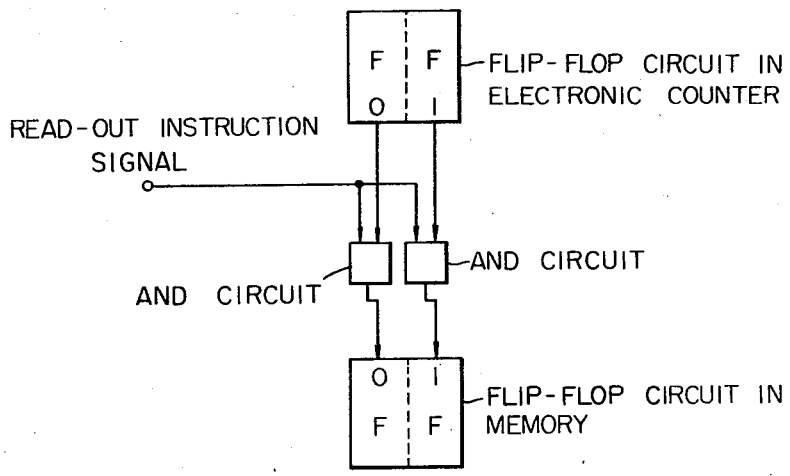
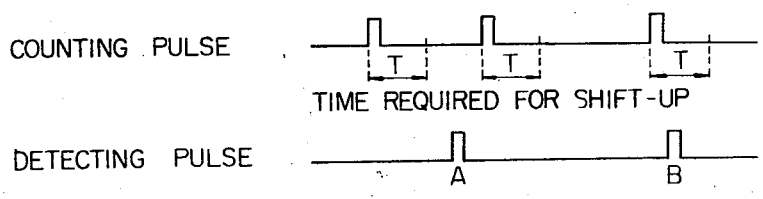

3,602,699

DEVICE FOR GENERATING AN INSTRUCTION SIGNAL FOR USE IN AN AUTOMATIC DIGITAL READOUT APPARATUS

BACKGROUND OF THE INVENTION

The present invention relates to a device for generating an instruction signal for use in an automatic digital readout apparatus and, more particularly, to the device of the type described above which can positively prevent an incorrect digitally indicated measured value of a displacement from being generated due to the interference period of the electronic counter of the apparatus, in which interference period shift-up in the counting process and the like is being carried out in the electronic counter so that the correct value cannot be provided Recently, a digital measuring apparatus such as a pulse-generating apparatus mounted on the rotating shaft of a lead screw, a length or angle measuring instrument utilizing Moire fringes, and a digital voltmeter has been widely developed. These digital measuring apparatuses generate in general electric pulses in the measuring station of the apparatus which are the multiple of the measuring unit corresponding to the displacement to be measured, and these electric pulses are utilized as counting pulses which are applied to the electronic counter of the apparatus so as to effect the counting. Therefore, the measured value is indicated by the numerical value in the indicating rotation of the electronic counter.

Thus, the troublesome and time-consuming procedure required in reading out a scale or a pointer of a measuring instrument heretofore used in the measurement can be entirely eliminated.

However, even though an electronic counter is utilized, the procedure to read out the digitally indicated measured value appearing in the indicating station of the electronic counter is still required. Such a procedure is, under particular conditions, very troublesome and time consuming.

That is, in order to read out the digitally indicated measured value appearing in the indicating station of the electronic counter, it is necessary that the indicated measured value remains unchanged in the indicating station until the readout of the indicated measured value is completed, thus necessitating the measuring station to be kept stationary in the readout period so that no counting pulses are applied to the electronic counter.

When the pitch of a lead screw is to be measured by a digital measuring apparatus, for example, a number of electric pulses proportional to the displacement of the table carrying the lead screw thereon which corresponds to the pitch of the lead screw are applied to the electronic counter so as to obtain the digitally indicated measured value of the displacement of the lead screw corresponding to the pitch thereof. In this case, in order to set the measuring point of the lead screw, a separate detecter such as a microscope mounted stationarily on the apparatus is provided, and the image of the lead screw is viewed through the microscope so that the table carrying thereon the lead screw is stopped each time successive one of the predetermined points on the lead screw appears at the set point in the field of view of the microscope as the table is moved.

Therefore, in case a large number of screw threads are to be measured for determining the pitch of the lead screw, the procedure for reading out the indicated measured value becomes more troublesome as the number of the measuring points increase.

For this reason, it is desirable if the measurement such as that for determining the pitch of a lead screw can be carried out automatically and continuously without stopping the movement of the table in case a large number of measuring points must be measured. There are many cases in which it is desired to carry out the measurement continuously and automatically because of a large number of the measuring points to be measured.

Thus, the utility of a digital measuring apparatus will be extremely increased, if the readout procedure of the digitally indicated measured value in the apparatus is not required by fully automating the digital measuring apparatus as described above.

In order to achieve the above-described full automation of the apparatus, there are several processes, in which, for example, the digitally indicated measured value obtained in the electronic counter is transferred to a separate memory of the apparatus each time the measurement reaches the desired measuring point, or two electronic counters are provided which are alternately switched to each other for the measurement and the indicated measured value obtained therein is transmitted to a separate memory of the apparatus.

To this end, the detector as described previously must be replaced by the one which can generate an electric pulse each time the measured value is to be read out.

In the measurement of the pitch of a lead screw as described above, for example, a photoelectric microscope is used in place of the microscope as described above, which photoelectric microscope can generate an electric pulse as the predetermined point in the image of the lead screw appearing in the field of view of the microscope passes the set point in the field of view.

At the same time, an output circuit is provided in the electronic counter which can effect the coding of the indicated measured value, and an instruction pulse for demanding the readout of the indicated measured value is applied to the output circuit thereby permitting the indicated measured value in the electronic counter to be transferred to the memory so as to read out the indicated measured value from the memory.

Such a procedure can be carried out, for example, by constructing the memory by the same number of flip-flop circuits as that of the flip-flop circuits constructing the electronic counter and by making the respective flip-flop circuits in the memory correspond to the respective ones in the electronic counter so as to form the respective pairs of the flip-flop circuits. And the output of each of the flip-flop circuits in the electronic counter and the readout instruction pulse obtained by the detecting pulse are applied to an AND circuit and the output of the AND circuit is applied to the corresponding flip-flop circuit in the memory forming the pair with the respective flip-flop circuit in the electronic counter.

Thus, in the case as described above, the detecting pulse is applied to the output circuit each time the predetermined point in the image passes the set point in the field of view of the photoelectric microscope used as the detector, so that the indicated measured value appearing in the electronic counter at the time the readout instruction pulse is applied to the output circuit is transferred to the memory through the output circuit thereby permitting the thus-transferred indicated measured value in the memory to be kept unchanged until the next detecting pulse is applied to the output circuit. Therefore, the measurement can be effected automatically and completely continuously.

The above-described apparatus in which the condition existing in an electronic circuit is successively transferred to another electronic circuit by a detecting pulse so as to be stored therein can be easily constructed by well-known technique. However, serious problems arise in the apparatus by merely constructing the same as described above. In other words, by such a construction of the apparatus, possibility of the faulty function of the apparatus cannot be avoided.

That is, when the digitally indicated measured value in the electronic counter is transferred to the memory by means of the detecting pulse, the indicated measured value in the electronic counter must be kept unchanged during a time period even though it is very short in order to correctly transfer the indicated measured value to the memory. However, the digitally indicated measured value in the electronic counter comprises in general a plurality of numerals, and a time period, even though it is very short, is required for shifting up of the numerals in the digitally indicated measured value. Therefore, a certain time period is required until the correct indicated value is obtained and kept unchanged after the counting pulse is applied to the electronic counter.

In such a time period required for obtaining the correct indicated value after the application of the counting pulse to the electronic counter, the indicated measured value in the electronic counter will not always be correct. Therefore, should the detecting pulse be applied to the output circuit in such a very limited time period, there might occur a danger that the digitally indicated measured value transferred to the memory is incorrect. The time period referred to above will be called the interference period of the electronic counter hereinafter.

The present invention aims at avoiding the above-described disadvantages and providing a novel and useful device for generating an instruction signal for use in an automatic digital readout apparatus which can properly transfer the indicated measured value from the electronic counter to the memory of the apparatus by applying the instruction signal even though the same is applied to the electronic counter within the interference period thereof.

SUMMARY OF THE INVENTION

An object of the present invention is to provide a novel and useful device for generating an instruction signal for use in an automatic digital readout apparatus utilizing counting pulses generated in response to the displacement to be measured, which device can properly transfer the digitally indicated measured value obtained in the electronic counter of the apparatus in response to the displacement to be measured to the memory of the apparatus by means of the readout instruction signal derived from the detecting pulse generated at the measuring point of the displacement.

Another object of the present invention is to provide a novel and useful device of the type described above, which can properly transfer the digitally indicated measured value obtained in the electronic counter to the memory even though the detecting pulse is applied to the electronic counter within the interference period thereof.

In accordance with the present invention, the readout instruction signal derived from the detecting pulse, which is generated at the measuring point of the displacement, is completely prevented from being applied to the output circuit of the electronic counter within the interference period thereof so as to prevent the interference between the counting pulses and the detecting pulse.

Thus, the broad application of the automatic digital measuring apparatus is made possible.

BRIEF DESCRIPTION OF THE DRAWINGS

FIG. 1 is a block diagram showing the general form of an automatic digital readout apparatus of a digitally indicated measured value;

FIG. 2 is a block diagram exemplarily showing the general circuit for transferring the digitally indicated measured value generated in the electronic counter to the memory of the automatic digital readout apparatus;

FIG. 3 is a diagram showing the possibility of causing faulty functions of the automatic digital readout apparatus due to the relationship between the occurrence of the counting pulses and the occurrence of the detecting pulse;

DETAILED DESCRIPTION OF THE PREFERRED EMBODIMENTS

Prior to the description of the present invention, prior art automatic digital readout apparatus will be briefly described for the better understanding of the present invention.

In FIG. 1, the electronic counter is provided with an output circuit which can effect the coding of the digitally indicated measured value generated in the electronic counter in response to the counting pulses supplied thereto from the measuring station, the counting pulses being generated in the measuring station in proportion to the displacement to be detected as described previously. A detecting pulse is generated in the detecting station when the displacement reaches the desired measuring point thereof and this detecting pulse is applied to the output circuit from the detecting station, so that the content of the electronic counter is transferred to the memory so as to be read out therefrom.

The memory comprises the same number of flip-flop circuits as that of the flip-flop circuits in the electronic counter and each of the flip-flop circuits in the memory is combined with the respective mating flip-flop circuit in the electronic counter so as to form the respective pair as shown in FIG. 2. An AND circuit is provided between the flip-flop circuits forming the pair as shown, to which the detecting signal, i.e. the readout instruction signal in this case is applied so that the output of the AND circuit is applied to the flip-flop circuit in the memory. Thus, each time the readout instruction signal is applied to the AND circuit, the indicated measured value generated in the electronic counter is transferred to the memory by means of each of the pairs of the flip-flop circuit as shown in FIG. 2, and the thus-transferred indicated measured value is kept unchanged until the next instruction signal is applied to the AND circuit so as to facilitate the readout of the indicated measured value from the memory.

Thus, the correct indicated measured value can be transferred to the memory insofar as the readout instruction signal is applied to the AND circuit after the interference period T of the electronic counter elapses as indicated by A in FIG. 3. However, if the readout instruction signal is applied to the AND circuit within the interference period T of the electronic counter as indicated by B in FIG. 3, there is a possibility that the correct indicated measured value might not be transferred to the memory for the reason previously described.

The present invention provides a device for generating a readout instruction signal in an automatic digital readout apparatus which can positively prevent the readout instruction signal derived from the detecting signal from being supplied to the output circuit of the electronic counter until the interference period thereof elapses after the application of the counting pulse to the electronic counter. Thus, an automatic digital readout apparatus can be freely used broadly in various applications in accordance with the present invention.

Figure 4:
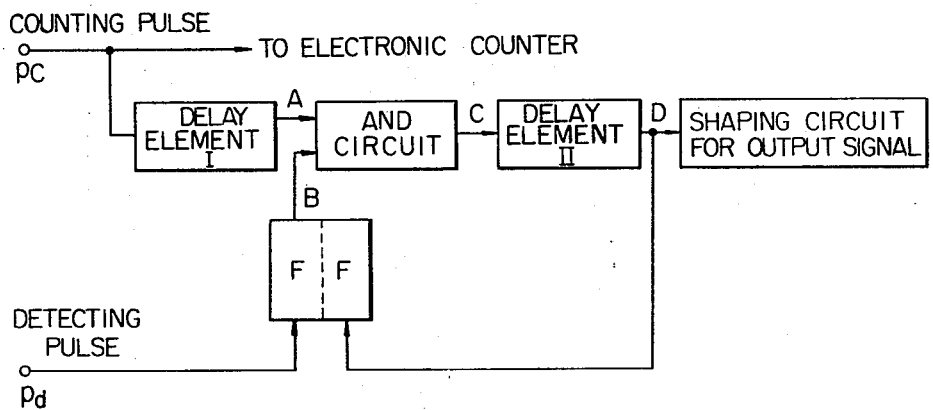
FIG. 4 is a block diagram showing an embodiment of the device constructed in accordance with the present invention for generating an instruction signal for demanding the readout of the digitally indicated measured value without faulty functions.
Figure 5:
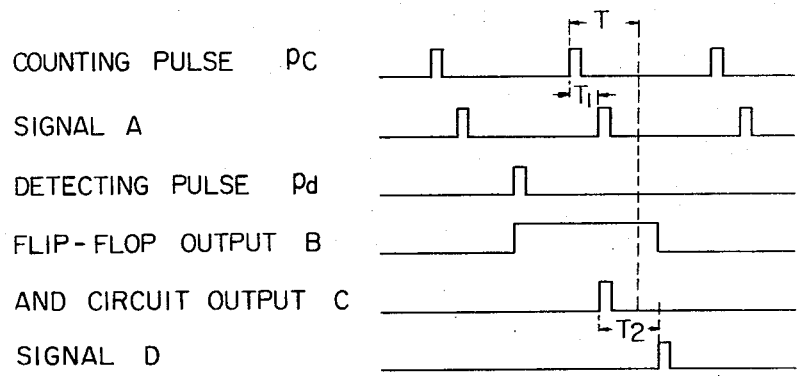
FIG. 5 is a time chart illustrating the operation of the device of FIG. 4.

Referring now to FIGS. 4 and 5 illustrating the concept of the present invention and the function thereof, the characteristic feature of the present invention will be described.

During the period in which the measuring station is not kept stationary, each of the counting pulses PC are successively applied to the electronic counter. After the electronic counter receives a particular counting pulse PC and begins the counting, the interference period T referred to previously is required until all the shifting-up of the numerals of the measured value is completed in an electronic counter and the electronic counter assumes the steady state indicating the correct indicated measured value in response to the above particular counting pulse.

In accordance with the present invention, the readout instruction signal derived from the detecting pulse Pd is delayed by at least the interference period T after the application of the counting pulse PC to the electronic counter, and only one output pulse is generated in response to one detecting pulse Pd applied to the electronic counter in order to obtain the correct indicated measured value.

To this end, in accordance with the characteristic feature of the present invention, the counting pulse PC is first applied to a delay element I so that a pulse which is delayed by a period $T_1$ from the application of the counting pulse PC is obtained as the output of the delay element I as shown in FIG. 4.

A flip-flop circuit which is adapted to bear or remember the application of the detecting pulse Pd thereto is separately provided, and the output of the flip-flop circuit is applied to an AND circuit together with the pulse supplied from the delay element I.

The output of the AND circuit is applied to a further delay element II which generates a pulse delayed by a period $T_2$ from the application of the output of the AND circuit. The thus-delayed pulse supplied from the delay element II is fed back to the flip-flop circuit so as to reset the same, while the delayed pulse is applied to a shaping circuit for the output signal serving as the readout instruction signal thereby permitting the readout instruction signal to be applied to the output circuit of the electronic counter so that the digitally indicated measured value in the electronic counter is transferred to the memory.

In this case, the sum of the delay periods $T_1$ and $T_2$ must be selected to be longer than the interference period T of the electronic counter, and, in case either one of the periods $T_1$ and $T_2$ is selected to be longer than the interference period T, the other of the periods $T_1$ and $T_2$ may be made zero, that is, either one of the delay element I and II may be omitted, if the other of the delay elements I and II can provide a delay period longer than the interference period T.

The operation of the above-described device will be described in connection to FIG. 5 illustrating a time chart. When the counting pulse PC is applied to the delay element I, the output signal A is obtained from the delay element I, which is delayed by the time $T_1$ from the application of the counting pulse PC. On the other hand, the flip-flop circuit experiences the inversion by the application of the detecting pulse Pd thereto so that a flip-flop output B is obtained as shown.

Therefore, an output C of the AND circuit is obtained when it receives both the signal A and the flip-flop output B. The output signal D obtained by the delay element II is thus delayed by the sum of the periods $T_1$ and $T_2$ from the application of the counting pulse PC to the delay element I. As described previously, the output signal D is fed back to the flip-flop circuit for returning it to the original condition so as to be ready for the next response to the application of the detecting pulse Pd, while the signal D is applied to the shaping circuit so as to demand the output circuit of the electronic counter for transferring the digitally indicated measured value generated in the electronic counter in response to the counting pulse PC to the memory of the apparatus without causing any faulty functions.

Figure 6:
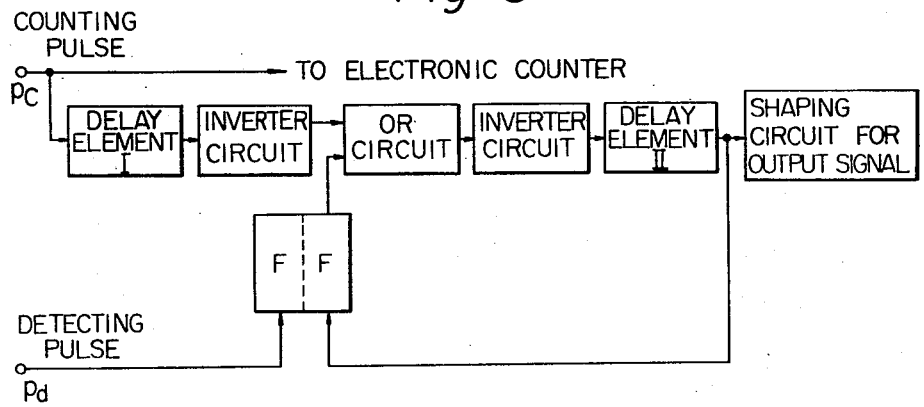
FIG. 6 is a block diagram showing a modification of the embodiment of FIG. 4.

FIG. 6 shows a modification of FIG. 4.

The construction shown in FIG. 6 is derived from that shown in FIG. 4 by the principle expressed by the following equation:

$$\{A \text{ (Output pulse of delay element I)}\} \vee \{F \text{ (Output of flip-flop circuit)}\} = (\overline{\overline{A} \vee \overline{F}})$$

In FIG. 6, instead of using the inverted output of the flip-flop circuit generated by the application of the detecting pulse Pd as in the case shown in FIG. 4, the output of the delay element I is inverted by an inverted circuit connected to the delay element I, and the thus-inverted output of the delay element I and the output of the flip-flop circuit are applied to an OR circuit as shown in FIG. 6, the output of the OR circuit is again inverted by a further inverter circuit connected to the OR circuit.

The function of the device shown in FIG. 6 is substantially similar to that shown in FIG. 4.

I claim:

1. Device for generating an instruction signal for use in an automatic digital readout apparatus of the measured value relating to the displacement at the measuring point thereof, in which a counting pulse is successively generated each time the displacement exceeds a measuring unit, and the thus-generated pulses are applied to the electronic counter of said apparatus so as to provide the digitally indicated measured value corresponding to the displacement, while the thus-provided digitally indicated measured value is transferred to the memory of said apparatus by means of a detecting pulse generated when the displacement is at said measuring point thereof thereby permitting said digitally indicated measured value at said measuring point to be stored in said memory, wherein the improvement comprises a separate readout signal circuit adapted to receive said counting pulses so as to provide the instruction signal for demanding said digitally indicated measured value to be transferred from said electronic counter to said memory, said readout signal circuit including at least one circuit element for delaying the transfer of the counting pulse received by said readout signal circuit after the same receives said detecting pulse by a time period longer than the interference period in said electronic counter in which period the correct digitally indicated measured value cannot be obtained due to the counting operation in said electronic counter, thereby permitting said instruction signal to be provided after said interference period elapses, and wherein said readout signal circuit comprises a flip-flop circuit and an AND circuit, so that said detecting pulse is applied to said flip-flop circuit to thereby invert the operating condition thereof, and the output of said flip-flop circuit and said counting pulses are applied to said AND circuit, at least one delay element being provided in the line in said readout signal circuit transmitting said counting pulses through said AND circuit, the total delay time of said at least one delay element being greater than said interference period, the output of said interference period, the output of said AND circuit being lead back to said flip-flop circuit to thereby reset the same.

2. Device according to claim 1, wherein said readout signal circuit comprises a first and second inverters, an OR circuit and a flip-flop circuit so that said counting pulses are lead to said first inverter circuit and said detecting pulse is applied to said flip-flop circuit to thereby invert its operating condition, the output of said first inverter and the output of said flip-flop circuit being applied to said OR circuit, the output of aid OR circuit being applied to said second inverter, the output of said second inverter being lead back to said flip-flop circuit to thereby reset the same, at lest one delay element being provided in the line in said readout signal circuit transmitting said counting pulses to said OR circuit, the total delay time of said at least one delay element being greater than said interference period.